United States Patent
Liao

(10) Patent No.: US 8,965,433 B2
(45) Date of Patent: Feb. 24, 2015

(54) METHOD AND ARRANGEMENT IN A COMMUNICATION SYSTEM

(75) Inventor: Jingyi Liao, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 423 days.

(21) Appl. No.: 13/503,934

(22) PCT Filed: Oct. 29, 2009

(86) PCT No.: PCT/CN2009/001201
§ 371 (c)(1),
(2), (4) Date: Apr. 25, 2012

(87) PCT Pub. No.: WO2011/050491
PCT Pub. Date: May 5, 2011

(65) Prior Publication Data
US 2012/0208584 A1    Aug. 16, 2012

(51) Int. Cl.
*H04B 7/00* (2006.01)
*H04B 17/00* (2006.01)

(52) U.S. Cl.
CPC .................................. *H04B 17/0007* (2013.01)
USPC ........................................................ 455/509

(58) Field of Classification Search
CPC .. H04B 17/0062; H04B 7/02; H04B 17/0007; H01Q 1/246; H01Q 3/267; H04W 72/04
See application file for complete search history.

(56) References Cited

U.S. PATENT DOCUMENTS

| | | | |
|---|---|---|---|
| 6,411,825 B1 | 6/2002 | Csapo et al. | |
| 7,493,119 B2 | 2/2009 | Bergstrom et al. | |
| 7,940,667 B1* | 5/2011 | Coady et al. | 370/238 |
| 2002/0061763 A1 | 5/2002 | Weissman | |
| 2003/0125044 A1* | 7/2003 | Deloach et al. | 455/456 |
| 2003/0186725 A1* | 10/2003 | Miya et al. | 455/561 |
| 2009/0186590 A1 | 7/2009 | Gale | |
| 2010/0093377 A1* | 4/2010 | Riley et al. | 455/456.6 |
| 2011/0039497 A1* | 2/2011 | Hammarwall et al. | 455/63.1 |

FOREIGN PATENT DOCUMENTS

| | | |
|---|---|---|
| CN | 101039134 A | 9/2007 |
| WO | 2009049511 A1 | 4/2009 |
| WO | 2010147515 A1 | 10/2010 |

OTHER PUBLICATIONS

Simić, Igor, "Evolution of Mobile Base Station Architectures", Microwave Review, Jun. 2007, pp. 29-34.
(Continued)

*Primary Examiner* — Andrew Wendell
*Assistant Examiner* — Maryam Soltanzadeh
(74) *Attorney, Agent, or Firm* — Murphy Bilak & Homiller, PLLC

(57) ABSTRACT

The present invention relates to the area of communication, and especially to a method and an arrangement for antenna calibration in a communication system comprising a baseband unit (BBU) and distributed radio remote units (RRUs). The present invention aims to limit antenna calibration duration in the antenna calibration chain. A cable delay based on the length of the cable connecting the BBU and the RRU is obtained. A delay compensation is calculated based upon the cable delay. Thereupon the antenna calibration chain utilized by the BBU and the RRU is adapted based upon the delay compensation.

18 Claims, 6 Drawing Sheets

(56) References Cited

OTHER PUBLICATIONS

Unknown, Author, 3GPP TS 36.211 V12.2.0, 3rd Generation Partnership Project; Technical Specification Group Radio Access Network; Evolved Universal Terrestrial Radio Access (E-UTRA); Physical channels and modulation (Release 12), Jun. 2014, pp. 1-121.

Yasui, Yutaka et al., "Adaptive Array Antenna for W-CDMA Systems", Fujitsu Sci. Tech. Journal, 38,2, available online at: http://www.fujitsu.com/downloads/Mag/vol38-2/paper10.pdf, Dec. 2002, pp. 192-200.

* cited by examiner

METHOD AND ARRANGEMENT IN A COMMUNICATION SYSTEM

TECHNICAL FIELD

The present invention relates to the area of communication, and especially to methods and arrangements for antenna calibration in a communication system.

BACKGROUND

A wireless communication system comprises an access network with radio network controllers (RNCs) and radio base stations (RBS) consisting of base band units (BBUs) performing base band signal processing. The RBS consist further of one or more radio remote units (RRUs), which convert the transmitting and receiving signals between baseband and radio frequencies and transmits and receives signals over one or more antennas. The base station architecture supports the connection between one baseband unit and several distributed RRUs.

Some wireless communication systems e.g. WCDMA and LTE systems support the application of multiple antenna techniques, e.g. MIMO techniques and beam forming techniques. A base station system using an adaptive beam forming algorithm is expected to increase its maximum range and capacity due to an improved antenna gain and the reduction of interference from other spatially separated users. E.g. an antenna array containing M elements can provide a mean power gain of M over white noise. Beam forming algorithms often assume that the antenna array has no errors and that the multi-channel transceiver has an identical transfer function. However due to mechanical and electrical variations in the RF components such as the amplifiers, mixers and cables that occur over time because of temperature variations, aging, and other factors, the spatial signature of the baseband receive/transmit signal is significantly different from that of the RF receive/transmit signal. This leads to the fact that the transfer functions of the RF transceivers are different from each other, i.e. the amplitude, time and phase deviations of the signals received/transmitted on the different antenna elements vary. In order to achieve the antenna gain it is important to perform antenna calibration compensating the amplitude, time and phase deviation among the different antenna elements. Especially for a LTE-TDD (Long Term Evolution—Time Division Duplex) system the antenna calibration across the antenna calibration chain i.e. the base station (i.e. eNodeB) transmit/receive chain is important when exploiting reciprocity.

When pursuing antenna processing solutions e.g. beamforming of the transmitted and received signals in a distributed RRU system, calibration of the amplitude, time and phase deviation among the different antenna elements in the different RRUs is performed. However, the antenna calibration among the different antenna elements in the different RRUs may have a strict limitation e.g. in a LTE TDD system calibration duration may be ask for in a special slot. The slot should be far less than an OFDM symbol duration, which symbol duration equals to about 71 μs. However, the receiving of the calibrated signal maybe out of the required range of the time window if the RRU is located far away.

The distance D between the BBU and the RRU result in a transmission delay described as $$\Delta t = 2D/3*10^8$$

Provided that the calibration duration i.e. the time acquired to compensate the transmission delay should be less than 20 μs, the cable distance between the BBU and the farthest RRU should be less than 3 km. When presuming additional delay introduced by the electronic components in the RRU and the BBU such as processing delay, it could be assumed that the distance between the BBU and the farthest RRU should be even less than 3 km. This may limit the deployment of the distributed RRU system.

SUMMARY

It is therefore an object of the present invention to provide an improved method and arrangement for antenna calibration in a communication system comprising distributed RRUs that limit the calibration duration.

The above stated object is achieved by means of a method and an arrangement according to the independent claims.

In accordance with a first aspect of the invention the object is achieved by a method for antenna calibration in a communication system. The communication system comprises an access network having radio network controllers, radio base stations comprising at least one BBU and a number of distributed RRUs. The BBU performs base band signal processing. Moreover, each RRU converts between baseband and radio frequencies and transmits and receives signals over at least one antenna. Furthermore, the BBU is connected with each RRU via a cable forming a BBU and RRU pair, which utilizes an antenna calibration chain for antenna calibration. The method comprises for each BBU and RRU pair a step of obtaining a cable delay based on a length of the cable. Based on the cable delay a delay compensation is calculated. The method also comprises a step of adapting the antenna calibration chain based on the calculated delay compensation.

In accordance with a second aspect of the invention the object is achieved by a radio base station comprising a unit for antenna calibration in a communication system. The radio base station comprises at least one BBU and a number of distributed RRUs. The BBU performs base band signal processing. Furthermore each RRU converts between baseband and radio frequencies and transmits and receives signals over at least one antenna. The BBU is connected with each RRU via a cable forming a BBU and RRU pair, which utilizes an antenna calibration chain for antenna calibration. The base station comprises a unit for obtaining a cable delay based on a length of the cable. It also comprises a unit for calculating a delay compensation. The delay compensation is based on the obtained cable delay. In addition, the radio base station comprises a unit for adapting the antenna calibration chain based on the calculated delay compensation.

An advantage of embodiments of the present invention is that they provide the possibility to process the calibration of the antenna elements of one or several distributed RRUs simultaneously and thereby reducing the calibration duration even when the RRUs are widely spread.

Yet another advantage of embodiments of the present invention is that they provide antenna calibration for distributed RRU systems regardless the access methods used in the communication system. Thus the present invention provides methods and arrangements which could be used in GSM, WCDMA, LTE and other communication systems.

Yet another advantage of embodiments of the present invention is that they provide antenna calibration for distributed RRU system utilizing distributed antenna systems i.e. network of spatially separated nodes connected to a common source via a transport medium providing wireless services.

Yet another advantage of embodiments of the present invention is that they provide a method which easily co-works with conventional antenna calibration procedures.

Further advantages and features of embodiments of the present invention will become apparent when reading the following detailed description in conjunction with the drawings.

BRIEF DESCRIPTION OF THE DRAWINGS

For a better understanding, reference is made to the following drawings and preferred embodiments of the invention.

DETAILED DESCRIPTION

Figure 1:
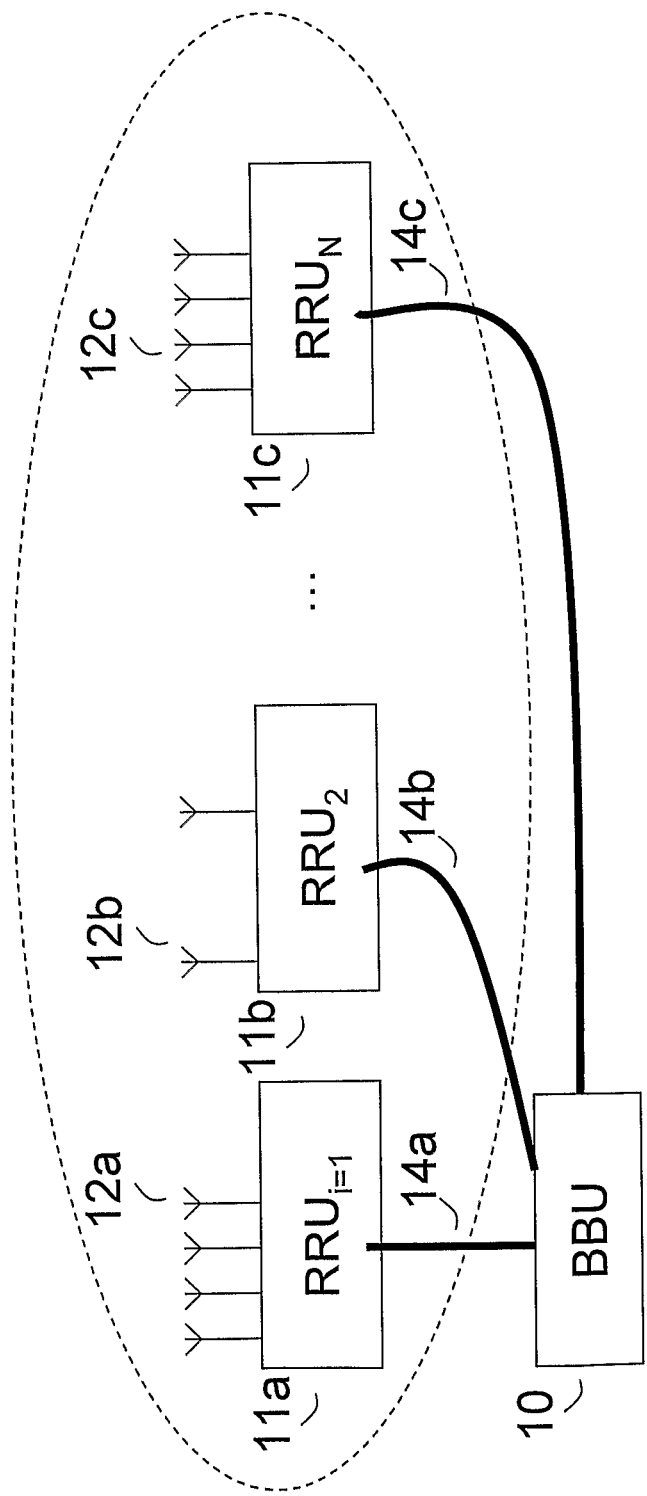
FIG. 1 illustrates schematically a communication system including a BBU and distributed RRUs wherein the present invention may be implemented.

In the following description, for purposes of explanation and not limitation, specific details are set forth, such as particular sequences of steps, signaling protocols and device configurations in order to provide a thorough understanding of the present invention. It will be apparent to one skilled in the art that the present invention may be practised in other embodiments that depart from these specific details. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

FIG. 1 illustrates a communication system including a base band unit (BBU) 10 and distributed radio remote units (RRUs) 11a, 11b, 11c wherein the present invention may be implemented. In a distributed RRU system, each RRU i.e. $RRU_{i=1}$ 11a and $RRU_2$ 11b and $RRU_N$ 11c may configure one or several antenna elements 12a, 12b, 12c and can be deployed in different locations. The BBU 10 and $RRU_1$ 11a, $RRU_2$ 11b and $RRU_N$ 11c form a BBU and RRU pair respectively. The ability to combine the transceiver signals from the different RRUs 11a, 11b, 11c has several benefits e.g. an increased coverage extension of a base station in the communication system. However, the distances between the BBU 10 and the $RRU_1$ 11a, the BBU 10 and $RRU_2$ 11b and the BBU 10 and $RRU_N$ 11c may vary and in the scenario as shown in FIG. 1 the respective distances differ from each other. The BBU 10 is connected to each RRU 11a, 11b, 11c with a cable 14a, 14b, 14c of a certain length. The different cable lengths of the RRU and BBU pairs result in different cable delays from the BBU 10 to the radio frequency (RF) part of the different RRUs 11a, 11b, 11c. This type of transceiver delay can to some extent be converted into delay diversity for the signals transmitted to or received from the RRUs 11a, 11b, 11c, for example if the difference of the delays is less than an accepted transceiver window provided by the communication system. Furthermore, this type of transceiver delay may have an impact on the transmitting and receiving schemes, e.g. by limiting the usage of the transmission and receiving schemes and especially the schemes pursuing the beamforming gain for the distributed RRU system.

Therefore the present invention provides improved method and arrangement for antenna calibration in a communication system comprising distributed RRUs and which aims to limit above described antenna calibration duration in the antenna calibration chain. The present invention obtains for each BBU and RRU pair a cable delay based on the length of the cable connecting the BBU and the RRU. A delay compensation is calculated based upon the cable delay. Thereupon the antenna calibration chain utilized by the BBU and the RRU is adapted based upon the delay compensation.

Figure 2:
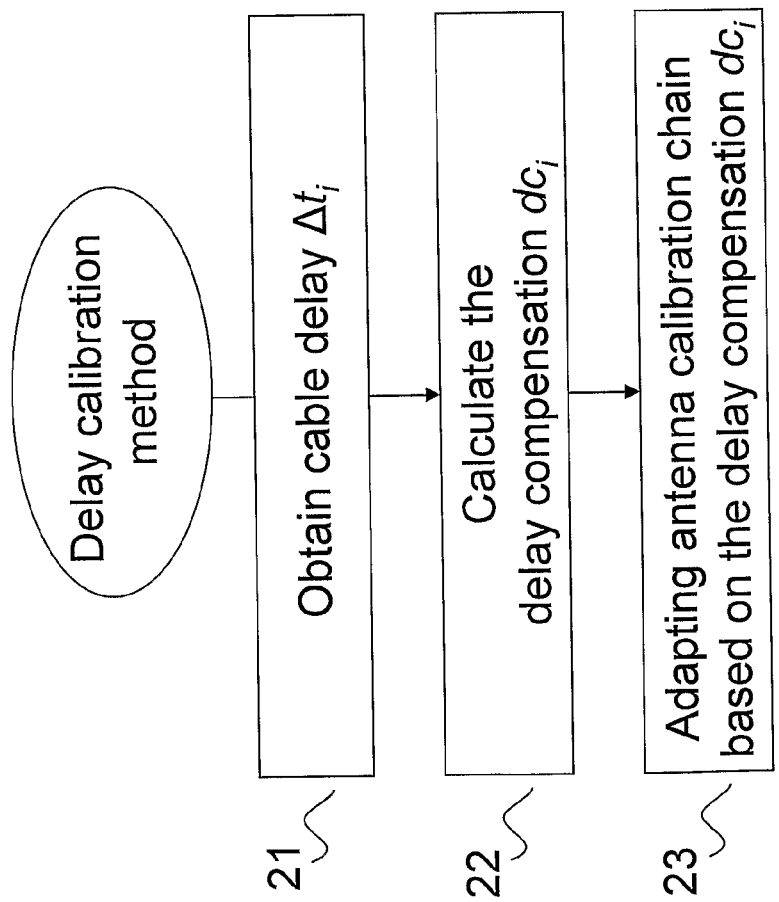
FIG. 2 is a flowchart of the method according to an embodiment of the present invention.

FIG. 2 shows a flowchart of the method according to an embodiment of the present invention. The method of FIG. 2 is a delay calibration method for antenna calibration in a communication system comprising distributed RRUs and is carried out in a transmit part of the communication system used for downlink transmissions or a receive part of the communication system used for uplink transmissions. In a step 21, a cable delay $\Delta t_i$ is obtained for each BBU and $RRU_i$ pair. The cable delay is based on the length of the cable connecting the BBU with the $RRU_i$ respectively and could be obtained in several ways e.g. by measuring or by calculating the cable delay based on cable characteristics. Based on the obtained cable delay $\Delta t_i$ a delay compensation $dc_i$ is calculated as shown in a step 22 in FIG. 2.

The delay compensation $dc_i$ could be calculated in several ways. In one embodiment of the present invention the delay compensation $dc_i$ for a BBU and $RRU_i$ pair is calculated by the following formula $$dc_i = \max\{\Delta t_1, \Delta t_2, \ldots \Delta t_N\} - \Delta t_i$$

Thus the delay compensation $dc_i$ for the BBU and $RRU_i$ pair is the highest obtained cable delay of all BBU and $RRU_i$ pairs subtracted with the cable delay $\Delta t_i$ of the BBU and $RRU_i$ pair. In another embodiment of the present invention the delay compensation $dc_i$ for the BBU and $RRU_i$ pair is calculated by the following formula $$dc_i = \text{tolerated\_delay}_i - \Delta t_i$$

where tolerated_delay$_i$ is a maximum value of tolerated cable delay by the BBU and $RRU_i$ pair. Thus the delay compensation for the BBU and $RRU_i$ pair is calculated to be the maximum value of the tolerated cable delay subtracted with the cable delay of the BBU and $RRU_i$ pair. In one embodiment of the present invention the maximum value of tolerated cable delay by the BBU and $RRU_i$ pair could be a predetermined value.

It should be noted that in one embodiment of the present invention different ways of calculating the delay compensation $dc_i$ could be used for different BBU and $RRU_i$ pairs in the same base station.

Figure 3:
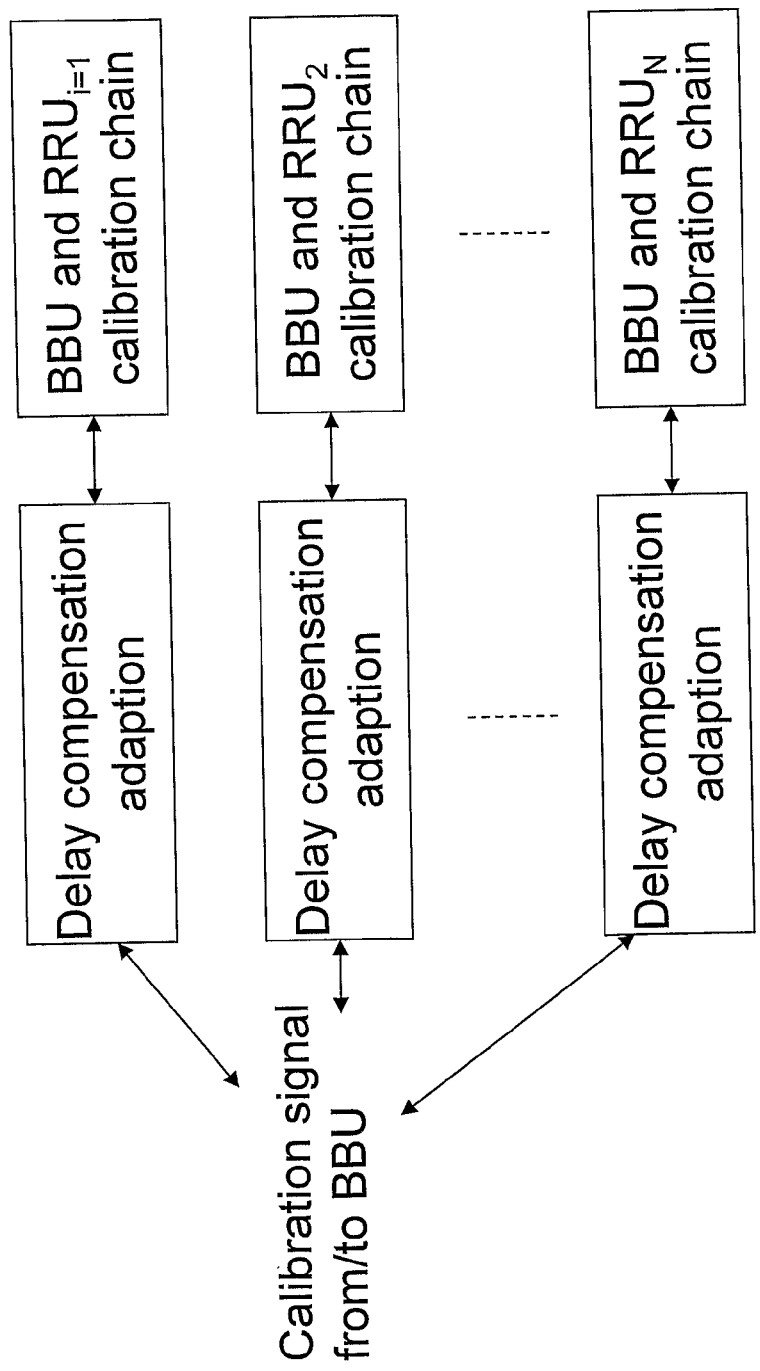
FIG. 3 illustrates adaption of the calibration chain in accordance with the present invention.

In a further step 23, an antenna calibration chain utilized by the BBU and $RRU_i$ pair is adapted based on the delay compensation $dc_i$. The delay compensation $dc_i$ can be added in a downlink antenna calibration chain or an uplink antenna calibration chain. FIG. 3 illustrates that the delay compensation adaptation is performed on a transmit antenna calibration chain when a calibration signal is sent by the BBU 10 in FIG. 1 to a transmit antenna 12a, 12b, 12c in the $RRU_i$ 11a, 11b, 11c. It also illustrates the delay compensation adaptation performed on a receive antenna calibration chain when a calibration signal is received by the BBU 10 from a receive antenna 12a, 12b, 12c in the RRU$_i$ 11a, 11b, 11c. The adaptation of the calibration chain could be performed by dropping all the received calibration signals into an accepted time window provided by the communication system. Antenna calibration could be performed on several antenna chains simultaneously. Calibration signals for the different antenna elements of the same or different RRU could be transmitted and received by the employment of special sequences e.g. calibration signals could be discriminated by the signals' inherent properties e.g. the auto- and/or the cross-correlation.

The adaption of the antenna calibration chain could be performed in several ways. In one embodiment of the present invention the adaptation is performed by buffering the calibration signals. Thus the calibration signals are stored in a buffer for a known period of time based on the calculated delay compensation $dc_i$ in order to let all calibration signals reach the target synchronously. It should be pointed out that different calibration signals may have different buffering time. In another embodiment of the present invention the adaptation is performed by adding a delay line to the antenna calibration chain. Thus the calibration signals inputted in the delay line reaches the output of the delay line after a period of time based on the calculated delay compensation $dc_i$ has elapsed.

In the following it is described how the present invention co-works with conventional antenna calibration procedures.

Figure 4:
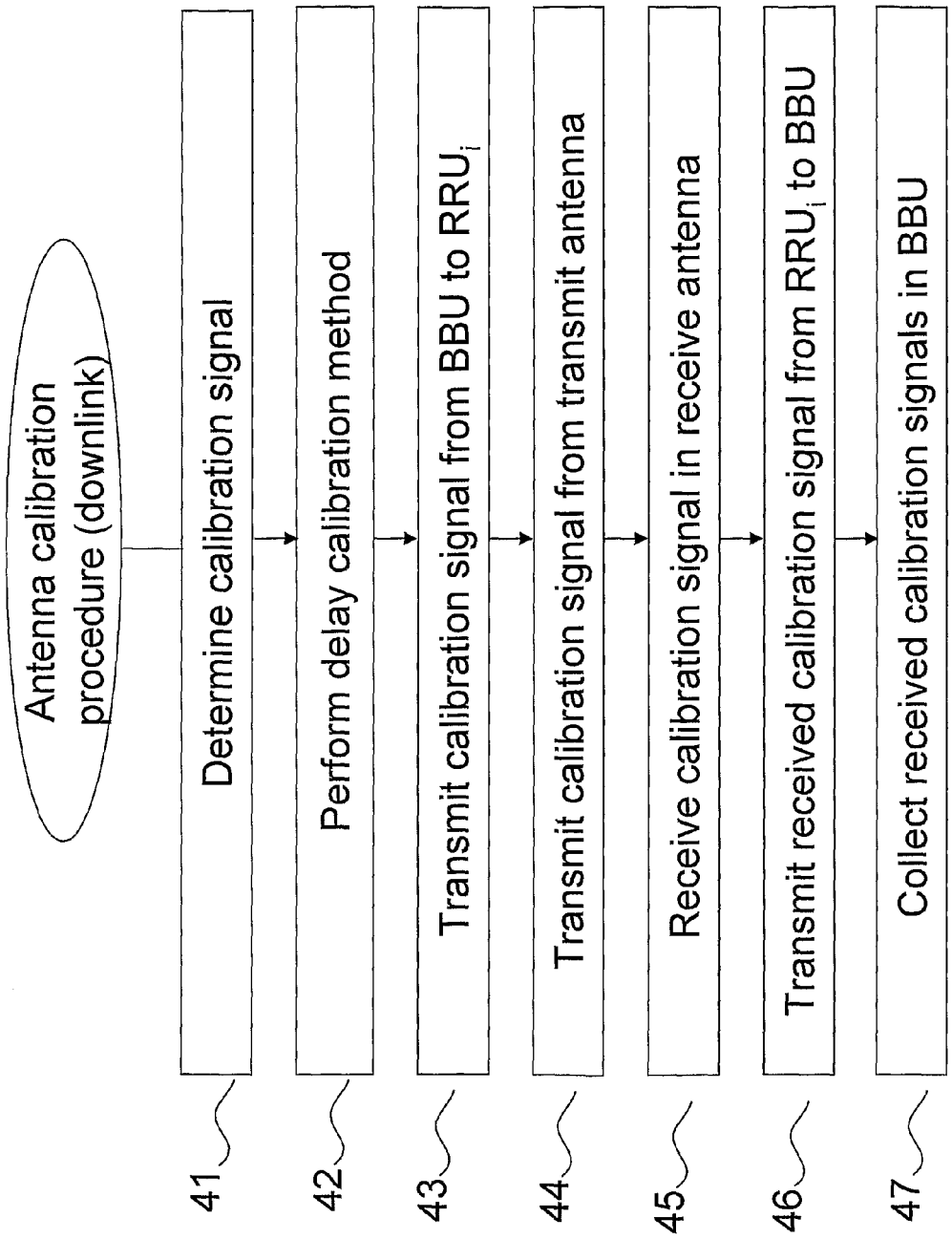
FIGS. 4 and 5 are flowcharts of the method according to embodiments of the present invention co-working with conventional antenna calibration procedures.

FIG. 4 shows a flowchart of the method according to embodiments of the present invention co-working with a conventional antenna calibration procedure. The described antenna calibration procedure could be used for downlink chain calibration performed on a downlink calibration chain in a communication system. In a step 41, a calibration signal is determined. There are several ways to determining a calibration signal, e.g. sending one calibration signal to all the antenna elements or sending several different calibration signals, whereof each calibration signal has its unique signature, to different antenna elements. The latter way has the advantage that the receiver easily can distinguish between the calibration signals. In a transmission performed in a communication system comprising distributed RRUs 11a, 11b, 11c, the calibration signal need to be split before transmitted to different antenna elements. In a step 42, the method according to embodiments of the present invention described above is performed. Thus, the downlink calibration chain is adapted based on a calculated delay compensation which is based on a cable delay. The calibration signal is transmitted 43 from the BBU 10 to the RRU$_i$ 11a, 11b, 11c. In a step 44, the calibration signal is transmitted from the RRU$_i$ 11a, 11b, 11c over a transmit antenna element 12a, 12b, 12c. The calibration signal is then received in the RRU$_i$ 11a, 11b, 11c over a receive antenna element in a step 45. Furthermore, the received calibration signal is transmitted from the RRU$_i$ 11a, 11b, 11c to the BBU 10 in a step 46. Finally, the calibration signals from all RRUs 11a, 11b, 11c are collected in the BBU 10 in a step 47.

Figure 5:
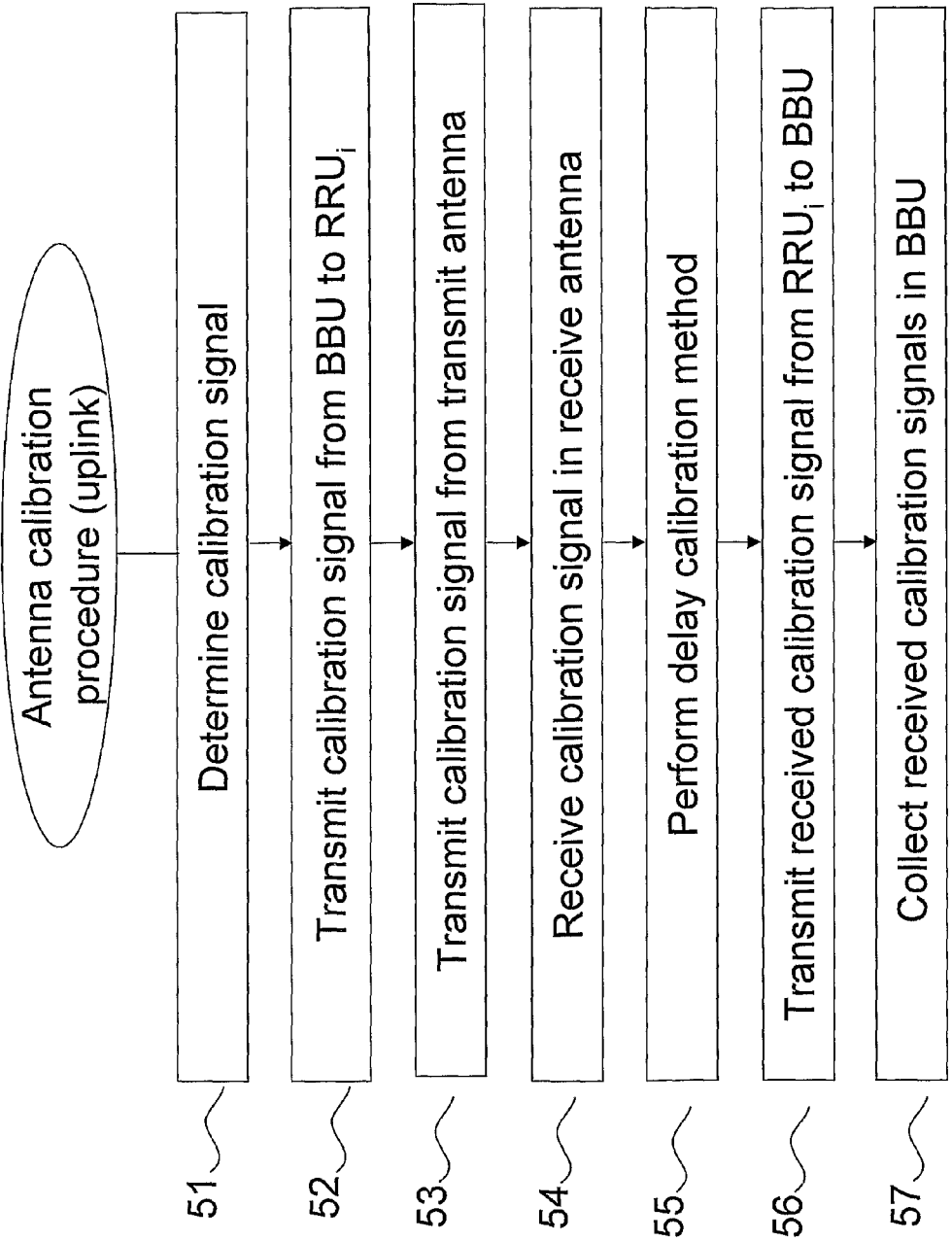

FIG. 5 also shows a flowchart of the method according to embodiments of the present invention co-working with a conventional antenna calibration procedure. The described antenna calibration procedure could be used for uplink chain calibration performed on an uplink calibration chain in a communication system. In a step 51, a calibration signal is determined. This could be performed in accordance with the method described above in conjunction with FIG. 4. The calibration signal is transmitted 52 from the BBU 10 to the RRU$_i$11a, 11b, 11c. In a step 53, the calibration signal is transmitted from the RRU$_i$ 11a, 11b, 11c over a transmit antenna element 12a, 12b, 12c. The calibration signal is then received in the RRU$_i$ 11a, 11b, 11c over a receive antenna element in a step 54. In a step 55, the method according to embodiments of the present invention described above is performed. Thus, the uplink calibration chain is adapted based on a calculated delay compensation which is based on a cable delay. Furthermore, the received calibration signal is transmitted from the RRU$_i$ 11a, 11b, 11c to the BBU 10 in a step 56. Finally, the calibration signals from all RRUs 11a, 11b, 11c are collected in the BBU 10 in a step 57.

Figure 6:
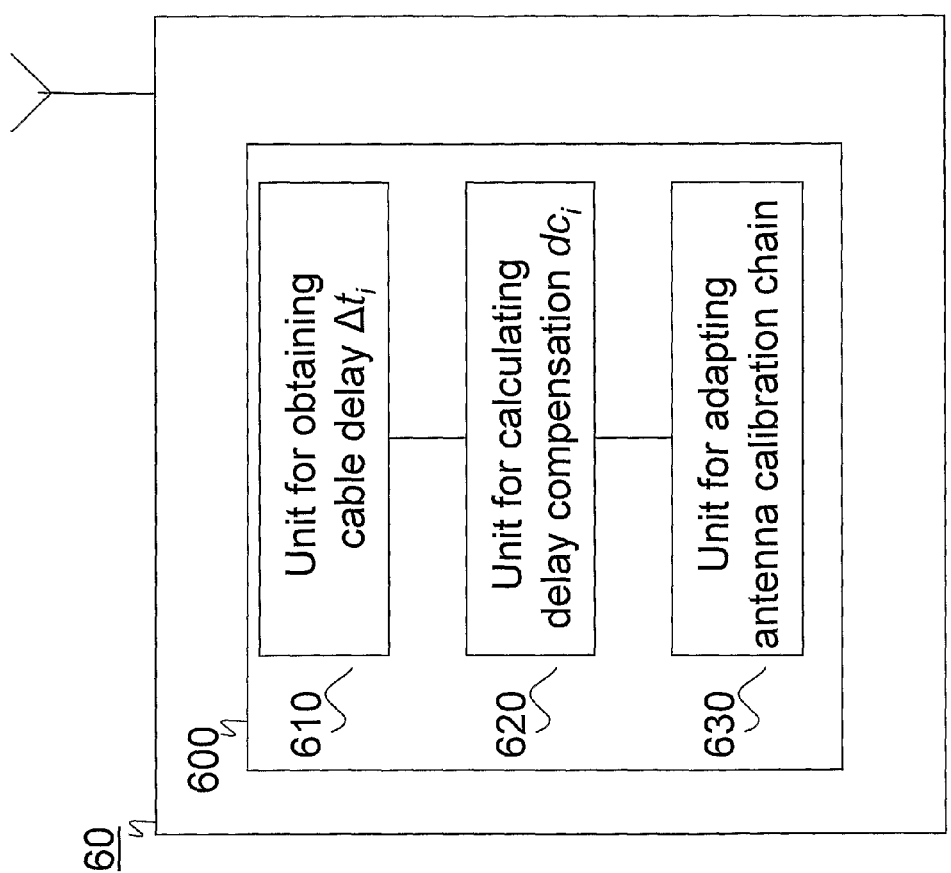
FIG. 6 is a schematic block diagram illustrating a radio base station comprised in a communication system according to one embodiment of the present invention.

The method shown in FIG. 2 may be implemented in a radio base station comprised in a communication system. An embodiment of the radio base station is illustrated in FIG. 6. It should be noted that the base station includes additional units such as a BBU, RRUs etc (not shown in FIG. 6) performing additional functionality as will be understood by the person skilled in the art. In the following only the units for carrying out the present invention are described in a more detailed way.

The radio base station 60 comprises a unit for antenna calibration 600. The base station 60 comprises a unit for obtaining a cable delay 610 based on a length of the cable 14a, 14b, 14c connecting the BBU 10 and the RRU 11a, 11b, 11c (shown in FIG. 1). Furthermore, the arrangement 600 comprises a unit for calculating a delay compensation 620. The delay compensation is based on the cable delay obtained in the unit for obtaining a cable delay 610. Additionally, it comprises a unit for adapting an antenna calibration chain 630 utilized by the BBU 10 and the RRU 11a, 11b, 11c for antenna calibration. The adaptation is based on a calculated delay compensation. The calculated delay compensation is calculated in the unit for calculating a delay compensation 620.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method for antenna calibration in a radio base station comprising a base band unit (BBU) that is connected to a number of distributed radio remote unit (RRUs) by respective cables to thereby form a corresponding number of BBU and RRU pairs, said method comprising for each BBU and RRU pair:
    obtaining a cable delay based on a length of the cable connecting the BBU and RRU pair;
    calculating a delay compensation based on the obtained cable delay; and
    adapting an antenna calibration chain used by the BBU and RRU pair for antenna calibration, based on the calculated delay compensation.

2. The method of claim 1, wherein the delay compensation for a selected BBU and RRU pair is the highest obtained cable delay of the number of BBU and RRU pairs subtracted with the cable delay of the selected BBU and RRU pair.

3. The method of claim 1, wherein a maximum value of a tolerated cable delay for a selected BBU and RRU pair is predetermined and the delay compensation for the selected BBU and RRU pair is calculated to be the predetermined maximum value of the tolerated cable delay subtracted with the cable delay of the selected BBU and RRU pair.

4. The method of claim 1, wherein the adaptation of said antenna calibration chain is performed by adding a delay line.

5. The method of claim 1, wherein the adaptation of said antenna calibration chain is performed by buffering the signals.

6. The method of claim 1, wherein said antenna calibration chain is a downlink antenna calibration chain.

7. The method of claim 1, wherein said antenna calibration chain is an uplink antenna calibration chain.

8. The method of claim 1, wherein the cable delay is calculated based on cable characteristics.

9. The method of claim 1, wherein the cable delay is measured.

10. A radio base station comprising:
- a base band unit (BBU) a base band unit (BBU) that is configured to be connected to a number of distributed radio remote unit (RRUs) by respective cables to thereby form a corresponding number of BBU and RRU pairs; and
- a unit configured to perform antenna calibration with respect to each said BBU and RRU pair and comprising:
  - a unit configured to obtain a cable delay based on a length of the cable connecting the BBU and RRU pair;
  - a unit configured to calculate a delay compensation based on the obtained cable delay; and
  - a unit configured to adapt an antenna calibration chain used by the BBU and RRU pair for antenna calibration, based on the calculated delay compensation.

11. The radio base station of claim 10, wherein the delay compensation for a selected BBU and RRU pair is the highest obtained cable delay of the number of BBU and RRU pairs subtracted with the cable delay of the selected BBU and RRU pair.

12. The radio base station of claim 10, wherein a maximum value of a tolerated cable delay for a selected BBU and RRU pair is predetermined and the delay compensation for the selected BBU and RRU pair is calculated to be the predetermined maximum value of the tolerated cable delay subtracted with the cable delay of the selected BBU and RRU pair.

13. The radio base station of claim 10, wherein the adaptation of said antenna calibration chain is performed by adding a delay line.

14. The radio base station of claim 10, wherein the adaptation of said antenna calibration chain is performed by buffering the signals.

15. The radio base station of claim 10, wherein said antenna calibration chain is a downlink antenna calibration chain.

16. The radio base station of claim 10, wherein said antenna calibration chain is an uplink antenna calibration chain.

17. The radio base station of claim 10, wherein the cable delay is calculated based on cable characteristics.

18. The radio base station of claim 10, wherein the cable delay is measured.

* * * * *